United States Patent Office 2,944,912
Patented July 12, 1960

2,944,912

ULTRAVIOLET ABSORBING WATERCOLOR PAINT COMPOSITIONS

James P. Kopley, Los Angeles, Calif., assignor to Printing Arts Research Laboratories, Inc., Santa Barbara, Calif., a corporation of Delaware No Drawing. Filed July 31, 1958, Ser. No. 752,187

8 Claims. (Cl. 106—193)

This invention relates generally to the art of printing and has particular reference to a paint composition for use in making corrections and additions on drawings to be reproduced by the "Fluorographic" process as disclosed in U.S. Patent No. 2,191,939 issued to Walter S. Marx, Jr.

A primary object of the present invention is to provide novel opaque watercolor paint compositions which absorb substantially more ultraviolet light than is reflected therefrom.

It is often necessary to correct or make additions, in varying shades of paint, to drawings prior to reproduction by the above-mentioned "Fluorographic" process. However, conventional opaque paints, which of necessity contain pigments, cannot be used since the pigments reflect the visible and accompanying ultraviolet light that strikes the painted surface, or at least they reflect a greater proportion of ultraviolet than is absorbed. Attempts have heretofore been made to produce an ultraviolet-absorbing gray or other color paint, but such attempts have not been entirely successful. Thus, gray water-based paints including an insoluble ultraviolet absorber such as anthracene have been prepared, but the absorber, being insoluble, forms a heterogenous pigment mixture with titanium dioxide, zinc oxide or other white pigment, from the surface of which ultraviolet is reflected because the absorber particles do not completely cover the white pigment particles. Therefore, the flat grays do not photograph "black" enough by ultraviolet light or through an ultraviolet filter for good reproduction. Another approach has been the use of water-soluble ultraviolet absorbing compounds, but these solutions of compounds appear to sink through the paint film, leaving exposed, or sparsely-covered reflective areas of the pigment. Another object of the present invention is, therefore, to provide ultraviolet absorbing paint compositions which are not subject to these and other disadvantages of those heretofore proposed and used but equal in all other paint properties, such as hiding power, flow-out, etc., to the usual paints.

Still another object of the present invention is to provide watercolor paint compositions which are opaque and which are capable of absorbing a major portion of the ultraviolet light in a given range to which they are exposed.

Other objects and advantages of the present invention it is believed will be readily apparent from the following detailed description of preferred embodiments thereof.

Briefly, this invention comprehends within its scope the discovery that ultraviolet absorbing paints can be produced by including in the paint composition, along with a soluble or dispersible ultraviolet absorber, a water soluble or dispersible, oil or wax-like material in which the absorber is soluble or dispersible and which functions as an exudation agent and carrier for the absorber. The exudation agent, which preferably comprises a polyethylene glycol, is soluble or dispersible in the water-base of the paint while the paint is in the liquid form, and compatible with the other constituents in solution or dispersion but upon or during drying of the paint film, the exudation agent exudes to the paint film surfaces. The absorber, being soluble or dispersible in the exudate, is carried thereby to the paint film surfaces where it is available to, and does, completely coat the white or other pigment particles.

The resulting watercolor paints are ultraviolet absorbing in accordance with the wave-length range of the ultraviolet absorber utilized. Thus, the paints of the present invention are especially suitable for use in the aforesaid "Fluorographic" process in that they absorb a greater proportion of ultraviolet light in the 340 to 410 millimicron wave-length range than is reflected so that sufficient ultraviolet light in this range is absorbed to provide a paint which is effectively non-actinic when photographed under exposure to light filtered to wave-lengths primarily within that wave-length range.

The following specific examples are illustrative of the compositions of the present invention, but it is to be understood that the invention is not to be limited to the details thereof:

*Example 1*

Vehicle:
    Water _____ 180 fl. oz.
    Film former blend—
        Polyvinyl pyrrolidone _____ 16⅞
                          (avoirdupois).
        25% dextrine solution _____ 90 fl. oz.
        Exudation agent _____ 33¾ oz. av.
    Ultraviolet absorber _____ 67½ oz. av.
    Dispersing agent _____ 5⅝ oz. av.
    Wetting agent (10% solution) ___ 1¼ fl. oz.
    Fungicide solution (25%) _____ 3½ fl. oz.
Pigments:                       Weight measure
    Titanium dioxide _____ 12 lb.
    Bone black _____ 1 oz. av.
    Colloidal silica _____ 1¾ oz. av.

The dextrine solution comprised a solution prepared by mixing 1 pound of white potato dextrine with 4 pints of water. While a blend of film formers is used for the purpose of this example, a single water soluble or dispersible film former, in the conventional minor amount, may be used. Thus, starch, dextrine, or any water soluble or dispersible resins or gums such as the polyvinyl pyrrolidone, methyl cellulose, sodium carboxymethyl cellulose, sodium polyacrylate, gum acacia, gum tragacanth, casein, etc., may be used alone or in combination.

The exudation agent used in Example 1 was "Carbowax" 4000. Other polyethylene glycols, including methoxy polyethylene glycols, having the general formula $ROCH_2(CH_2OCH_2)_xCH_2OH$, where R is hydrogen or $CH_2$, may be used. While the polyethylene glycols are preferred as exudation agents, other materials may be used in place thereof. In fact, the exudation agent or exudate comprises any wax-like or oil-like material in which the ultraviolet absorber is soluble or dispersible and which is compatible, in aqueous solution, with the ultraviolet absorber and film former. The exudation agent must, of course, be sufficiently water soluble or water dispersible, when containing the absorber, to maintain the paint homogeneity for a reasonable period of storage. Materials meeting these specifications will "bleed," migrate or otherwise exude from the drying paint film, carrying with them the absorber, so that when the film is dry, sufficient absorber is deposited over the pigment particles to effectively cover them at the film surface.

Other examples of exudation agent are the normally liquid fatty acids (butyric, isovaleric, oleic, etc.); glycerides such as castor oil and coconut oil; organic phosphorous compounds such as tricresyl phosphate; n-butyl and dibutyl phthalate; chlorinated hydrocarbon derivatives such as propylene dichloride, trichloroethylene, chlorinated diphenyls and chlorinated naphthalene; monohydric cyclic alcohols such as cyclohexanol and furfuryl alcohol; hydroxy acid esters such as ethyl and butyl lactate; butyl, isobutyl and ethyl acetates; glycerol diacetate; propylene glycol; glycerol; amines such as monoisopropanolamine.

The specific ultraviolet absorber of Example 1 was 4,4' diamino-2,2' disulfo stilbene. Any conventional ultraviolet absorber capable of absorbing ultraviolet light of wave-lengths between about 340 and 410 millimicrons may be used so long as it is soluble or dispersible in the exudation agents and compatible with the exudation agent and film former in solution. These include, in addition to the stilbene derivatives, benzophone derivatives such as 2, 2', 4, 4' tetrahydroxy benzophenone; amino acids such as 2 naphthylamine-6,8 disulfonic acid and asparagine; quinine compounds such as quinine, quinine bisulfite; picric acid and derivatives thereof; anthracene derivatives; coumarin derivatives such as beta methyl umbelliferone and 4-methyl, 7-diethyl amino coumarin; nitrogen compounds such as para nitro phenol and 3,5-dinitro salicylic acid; and aniline compounds such as dimethyl aminoazo-benzene and benzene-azo-beta-naphthylamine. Here again, the amount of absorber can be varied, so long as a sufficient amount is present to absorb the ultraviolet light used in the reproduction process. Preferably the ratio of film former to absorber is of the order of 1:2.

Specific examples of compatible exudate-absorber mixtures are: monoisopropanolamine or "Diglycol Oleate S," a diethylene glycol oleate, with 4,4' diamino-2,2' disulfo stilbene; n-butyl phthalate, butyl Carbitol, diacetone alcohol, glyceryl diacetate or propylene glycol with 2, 2', 4, 4' tetrahydroxy benzophenone; propylene glycol with quinine sulfate; glycerol or ethyl "Cellosolve" with quinine bisulfate; diacetone alcohol, propylene glycol, glycerol diacetate or butyl Carbitol with the coumarin derivative, beta methyl umbelliferone under alkaline conditions; polyethylene glycol or "Diglycol Oleate S" with benzyl beta methyl umbelliferone. Both quinine sulfate and bisulfate are soluble in dilute mineral acids and such solutions can be used as the water phase of emulsions with oils, soaps or organic solvents. The amino acid, 2 naphthylamine-6,8 disulfonic acid is soluble in monoisopropanolamine and also in aqueous alkali and, therefore, can be used as the water phase of emulsions.

Minor amounts of dispersing and wetting agents, as well as a fungicidal agent are preferably, although not essentially, included in the vehicle. The specific dispersing agent used in Example 1 was "Marasperse" N, a highly purified sodium lignosulfonate. The particular wetting agent used was a 10% aqueous solution of "Triton" X-100, an alkyl aryl sulfonate. The fungicide solution comprised an aqueous solution of sodium pentachlorophenate prepared by dissolving 1 pound of the compound in water to make up 4 pints of total solution.

Any titanium dioxide or other white pigment, such as zinc oxide may be used.

Pigments, such as titanium dioxide, zinc oxide, as well as mixtures of titanium dioxide with calcium sulfate, or titanium dioxide with barium sulfate are not as strongly reflective of light within the wave-length range 350 to 400 millimicrons as other white pigments, and are thus preferred for the purpose of this invention, because one of its objects is to depress reflectance, from the paint film, of light within that range.

Where the advantages of this invention are desired for the production of colored paint, the following pigments are effective: blues—phthalocyanine, milori blue, and ultramarine blue; reds—alizarin red and indian red; yellows—zinc yellow, hansa yellow and chrome yellow.

In making up the vehicle of Example 1, the water was heated to about 150° F. to accelerate dispersion, and the materials, with the exception of the wetting agent, mixed in in the order given, using a high speed mechanical stirrer. The pigments were added to the vehicle with continued agitation until the mixture was relatively smooth, whereupon it was milled. The wetting agent was added with thorough stirring after the milling operation. The paint composition thus prepared was a near white gray color.

The following examples illustrate varying shades of gray, the darkness increasing from Example 2 through Example 5:

Example 2

The vehicle was the same as in Example 1. The pigment mixture was as follows:

| | |
|---|---|
| Titanium dioxide | 11⅝ lb. |
| Bone black | 6⁵⁄₁₆ oz. |
| Yellow iron oxide | 4⁵⁵⁄₆₄ oz. |
| Brown iron oxide | 48 grains. |

Example 3

The vehicle was the same as in Example 1. The pigments comprised:

| | |
|---|---|
| Titanium dioxide | 11¼ lb. |
| Bone black | 26¹⁵⁄₁₆ oz. |
| Yellow iron oxide | 3¾ oz. |
| Brown iron oxide | 1¹¹⁄₁₆ oz. |

Example 4

The vehicle was the same as in Example 1. The pigments comprised:

| | |
|---|---|
| Titanium dioxide | 8 lb. |
| Bone black | 3 lb. 6 oz. |
| Yellow iron oxide | 6⁹⁄₁₆ oz. |
| Brown iron oxide | 2⁷⁄₆₄ oz. |

Example 5

The vehicle was the same as in Example 1, except that after the milling operation, 3 oz. of the "Triton" X-100 was added, together with 1¼ oz. of "Triton" 770. The pigments comprised:

| | |
|---|---|
| Titanium dioxide | 4 lb. 11 oz. |
| Bone black | 6 lb. 9 oz. |
| Yellow iron oxide | 9³⁹⁄₆₄ oz. |
| Brown iron oxide | 2³⁷⁄₆₄ oz. |

For best results, when using the polyvinyl pyrrolidone film former, the amounts of the major ingredients should be maintained within the following ranges, based on percentages by weight of the non-aqueous ingredients:

| | Percent by weight |
|---|---|
| Film former | 9–11 |
| Exudation agent | 9–11 |
| Ultraviolet absorber | 18–22 |
| Pigments | 56–64 |

The percentage by weight of other film formers will depend upon their specific viscosities and the manufacturer's recommendations in accordance with same and could vary from 3% to 20% or more. Accordingly, the percentage for exudation agent, ultraviolet absorber, and pigments would vary proportionally. It will be seen from the foregoing that the ultraviolet absorber and exudation agent constitute less than one-half of the non-aqueous constituents of the paint composition.

Preferably, the following relative proportions of the ingredients should be maintained: film former to exudation agent, 1:0.8–1:1.2; absorber to exudation agent, 1:1 up to the limit of solubility. Sufficient pigment should be included to provide the desired hiding power with adequate flow-out, as is readily apparent to those skilled in the art.

Having fully described my invention, it is to be understood that I do not wish to be limited to the details

I claim:

1. A water-based paint containing pigment and water-soluble organic film-forming ingredients and having homogeneously incorporated therein materials providing ultraviolet absorption properties to said paint, said materials consisting essentially of a substance capable of absorbing ultraviolet light of wave lengths between about 340 and 410 millimicrons and an organic exudation agent in which said ultraviolet-absorbing substance is soluble, said exudation agent being exudable from the paint film after the paint has been applied to thereby carry the ultraviolet-absorbing substance to the surface of said paint film, said ultraviolet-absorbing substance and exudation agent constituting less than one-half of the nonaqueous constituents of the paint but being present in said paint in sufficient quantity to cause said paint when applied to absorb a greater proportion of ultraviolet light in said 340 to 410 millimicron wave-length range than is reflected in said range, and said exudation agent being present in sufficient quantity to dissolve said ultraviolet-absorbing substance.

2. The water-based paint defined in claim 1 wherein the exudation agent is a polyethylene glycol.

3. The water-based paint defined in claim 1 wherein the pigment ingredients comprise titanium dioxide.

4. The water-based paint defined in claim 1 wherein the ultraviolet absorber substance is 4,4' diamino-2,2' disulfo stilbene.

5. The water-based paint defined in claim 1 wherein the pigment ingredient comprises titanium dioxide and the exudation agent is a polyethylene glycol.

6. The water-based paint defined in claim 1 wherein the ultraviolet absorber substance is 4,4' diamino-2,2' disulfo stilbene and the exudation agent is a polyethylene glycol.

7. The water-based paint defined in claim 1 wherein the ratio of film forming ingredient to exudation agent is from 1:0.8 to 1:1.2 and the ratio of ultraviolet absorber substance to exudation agent is from 1:1 up to the limit of solubility of said ultraviolet absorber substance in said exudation agent.

8. A watercolor paint composition comprising in addition to a pigment and a film former, materials providing ultraviolet absorption properties to said paint composition, said materials consisting essentially of 4,4' 2,2' disulfo stilbene and a polyethylene glycol, the ratio of said polyethylene glycol to said film former being from 1:0.8 to 1:1.2 and the ratio of said 4,4' diamino-2,2' disulfo stilbene to said polyethylene glycol being from 1:1 up to its limit of solubility in said polyethylene glycol.

References Cited in the file of this patent

UNITED STATES PATENTS

| | | |
|---|---|---|
| 1,973,488 | Kocher | Sept. 11, 1934 |
| 2,011,428 | Voorhees | Aug. 13, 1935 |
| 2,038,114 | Joseph | Apr. 21, 1936 |
| 2,193,035 | Matthews et al. | Mar. 12, 1940 |
| 2,209,419 | Rooney et al. | July 20, 1940 |
| 2,415,624 | Brown et al. | Feb. 11, 1947 |
| 2,580,461 | Pearl | Jan. 1, 1952 |
| 2,600,093 | Coe | June 10, 1952 |
| 2,614,940 | Freyermuth et al. | Oct. 21, 1952 |